United States Patent
Wegener et al.

(10) Patent No.: US 12,483,742 B2
(45) Date of Patent: Nov. 25, 2025

(54) CHARGING DEVICE FOR ELECTRICALLY OPERATED VEHICLES AND METHOD

(71) Applicant: NUMBAT GMBH, Kempten (DE)

(72) Inventors: Willi Wegener, Hürth (DE); Beate Banzhaf-Schall, Salach (DE)

(*) Notice: Subject to any disclaimer, the term of this patent is extended or adjusted under 35 U.S.C. 154(b) by 0 days.

(21) Appl. No.: 18/024,830

(22) PCT Filed: Sep. 7, 2021

(86) PCT No.: PCT/DE2021/100732
§ 371 (c)(1),
(2) Date: Mar. 6, 2023

(87) PCT Pub. No.: WO2022/048709
PCT Pub. Date: Mar. 10, 2022

(65) Prior Publication Data
US 2023/0319336 A1 Oct. 5, 2023

(30) Foreign Application Priority Data
Sep. 7, 2020 (DE) ...................... 10 2020 123 284.5

(51) Int. Cl.
*H04N 21/414* (2011.01)
*B60L 53/18* (2019.01)
(Continued)

(52) U.S. Cl.
CPC ........ *H04N 21/41415* (2013.01); *B60L 53/18* (2019.02); *B60L 53/305* (2019.02);
(Continued)

(58) Field of Classification Search
CPC ......... H04N 21/41415; H04N 21/2393; H04N 21/25816; H04N 21/41407;
(Continued)

(56) References Cited

U.S. PATENT DOCUMENTS

| | | |
|---|---|---|
| 2013/0041850 A1 | 2/2013 | LaFrance |
| 2013/0110632 A1* | 5/2013 | Theurer .................. G06F 1/266 705/14.58 |

(Continued)

FOREIGN PATENT DOCUMENTS

| | | |
|---|---|---|
| CN | 108466562 A | 8/2018 |
| DE | 10 2017 215 881 A1 | 3/2019 |

(Continued)

OTHER PUBLICATIONS

International Search Report and Written Opinion for PCT/DE2021/100732, issued by the European Patent Office; Dec. 14, 2021; 11 pgs. Including Engl. Translation of Search Report.

*Primary Examiner* — Adil Ocak
(74) *Attorney, Agent, or Firm* — Mueting Raasch Group

(57) ABSTRACT

The invention relates to a charging device (100) for electrically operated vehicles, a method for charging a vehicle electric storage unit, a computer program product, and a computer readable storage media. In particular, the invention relates to a charging device (100) for electrically operated vehicles, comprising a charging unit (102) for charging an electric vehicle storage unit of the vehicle, a receiving device (104) for receiving video and/or audio data, and a communication unit (106) arranged and configured to establish a data connection (108) with a playback unit and to provide the video and/or audio data to the playback unit by means of the data connection (108).

17 Claims, 2 Drawing Sheets

Figure 1:
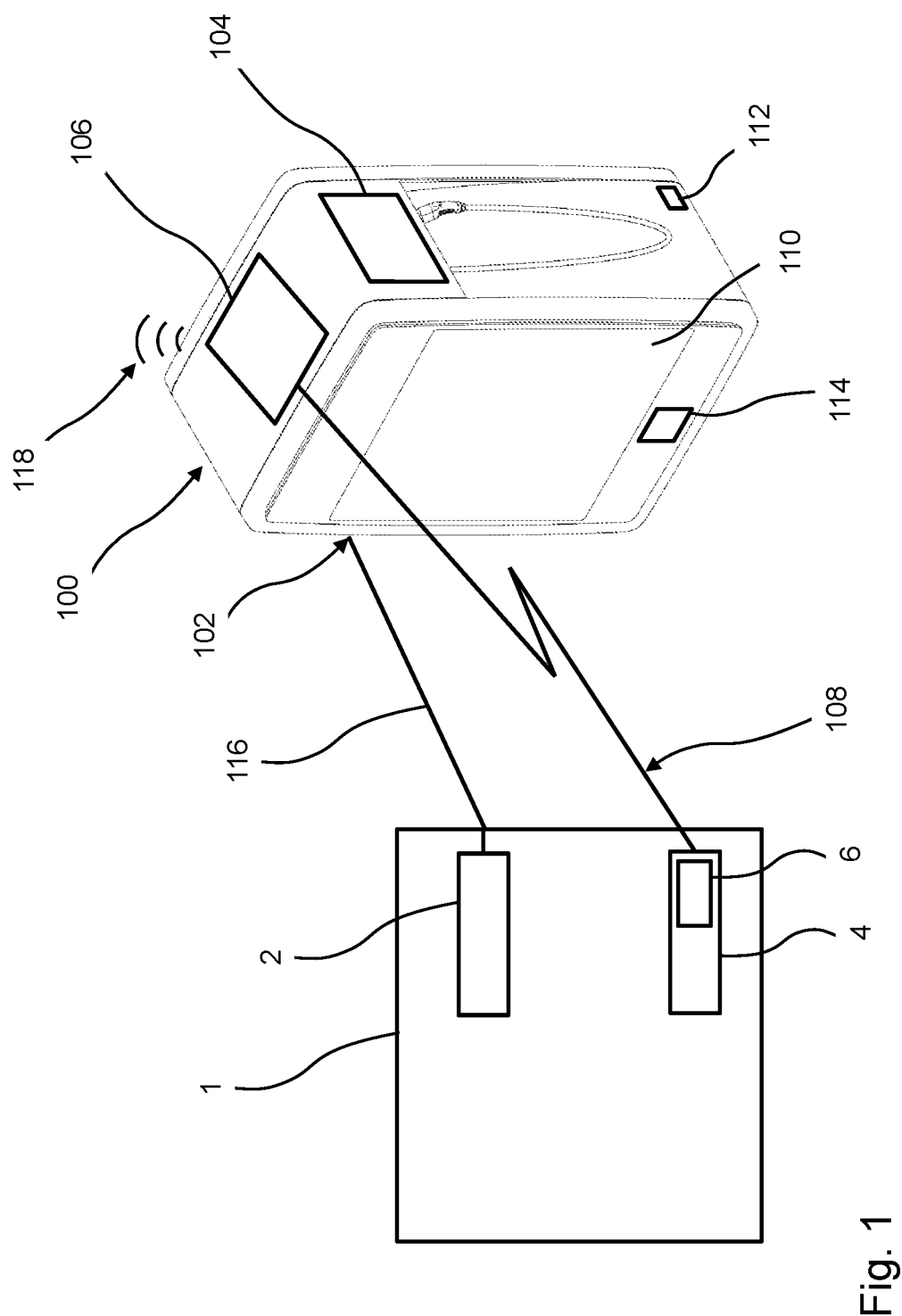

(51) Int. Cl.
   *B60L 53/30*      (2019.01)
   *B60L 53/66*      (2019.01)
   *H04N 21/239*     (2011.01)
   *H04N 21/258*     (2011.01)

(52) U.S. Cl.
   CPC .......... *B60L 53/66* (2019.02); *H04N 21/2393* (2013.01); *H04N 21/25816* (2013.01); *H04N 21/41407* (2013.01); *H04N 21/41422* (2013.01); *B60L 2250/16* (2013.01)

(58) Field of Classification Search
   CPC . H04N 21/41422; B60L 53/18; B60L 53/305; B60L 53/66; B60L 2250/16; B60L 2240/70; B60L 2250/20; B60L 53/62; B60L 53/65; B60L 53/53; Y02T 10/70; Y02T 10/7072; Y02T 10/72; Y02T 90/167; Y02T 90/12; Y02T 90/16; Y02T 90/14; H02J 7/0042; H02J 2310/48; Y04S 30/14; G06F 9/06; B60Y 2200/91

USPC .......................................................... 725/25
   See application file for complete search history.

(56) References Cited

U.S. PATENT DOCUMENTS

2014/0232320 A1      8/2014   Ento July
   2018/0370379 A1     12/2018   Chen
   2019/0130449 A1      5/2019   Kaneichi et al.
   2019/0294135 A1      9/2019   Madrid et al.
   2019/0344681 A1     11/2019   Wiles
   2020/0242421 A1*     7/2020   Sobhany ................ B60W 50/08

FOREIGN PATENT DOCUMENTS

DE    10 2019 107 051 A1    9/2019
   DE    10 2018 115 993 A1    1/2020
   JP       2013-042650 A      2/2013
   JP       2014-154092 A      8/2014
   JP       2019-082750 A      5/2019

* cited by examiner

CHARGING DEVICE FOR ELECTRICALLY OPERATED VEHICLES AND METHOD

This application is the § 371 U.S. National Stage of International Application No. PCT/DE2021/100732, filed 7 Sep. 2021, which claims the benefit of German Application No. 10 2020 123 284.5, filed 7 Sep. 2020, the disclosures of which are incorporated by reference herein in their entireties.

The invention relates to a charging device for electrically operated vehicles, a method for charging an electric vehicle storage unit, a computer program product, and a computer readable storage media.

Charging devices are known in principle. Charging devices are used to charge electric storage devices with electrical energy. An electric storage device may be an accumulator, for example. Vehicles, such as passenger cars and trucks, are currently powered to a predominant extent by internal combustion engines. Alternatively or complementarily, vehicles can also be powered by electric machines, often referred to as electric motors. The electric machine drives the vehicle through a direct or indirect coupling with the wheels of the vehicle.

The electric machine is typically coupled to a vehicle storage unit of the vehicle, which provides electrical power to the electric machine. Such vehicle electric storage units are usually charged on a regular basis. In so-called hybrid vehicles, this can be done, for example, by coupling them to an internal combustion engine.

In addition, vehicle storage units can be charged at a charging device and/or by recuperation during deceleration of a vehicle.

The vehicle electric storage unit can be coupled to a charging device so that the vehicle storage unit is charged by means of the charging device. For example, a common type of charging device includes a charging cable arranged at a charging interface of the vehicle so that electrical power is transferred from the charging device to the vehicle storage unit. The charging cable can also be used to transmit data between the charging device and the vehicle.

In addition, other charging methods are available, such as inductive charging. Charging electric vehicle storage units generally requires more time than filling a vehicle tank with fuel. Charging electric vehicle storage units can take 20 to 60 minutes, for example, although shorter and longer charging times are also possible. To allow electrically operated vehicles to be operated over longer distances, charging devices must be provided along these routes.

The use of playback units, especially user terminals, is steadily increasing in importance, and a network connection with a high data transfer speed is important. Along the previously mentioned routes, available networks for playback units, in particular user terminals, are not available or are only available to a limited extent. In particular, the available data transfer speed at which data can be downloaded from or uploaded to the network is often low. Furthermore, the use of user terminals may reduce the charging speed for the vehicle electric storage unit of the vehicle if the same transmission means, such as a charging cable, is used for a data transmission to the user terminal and for a power transmission to charge the vehicle storage unit. As a result, the time required for charging the vehicle storage unit is increased by using user terminals.

It is therefore an objective of the invention to provide a charging device for electrically operated vehicles, a method for charging an electric vehicle storage unit, a computer program product, and a computer readable storage media that reduce or eliminate one or more of said disadvantages. In particular, it is an objective of the invention to provide a solution that enables better data transfer for users of playback units and charging devices. Furthermore, it is an objective of the invention to provide a solution that improves the charging power of a charging device.

According to a first aspect, the objective is solved by a charging device for electrically operated vehicles, comprising a charging unit for charging an electric vehicle storage unit of the vehicle, a receiving device for receiving video and/or audio data, and a communication unit coupled to the receiving device, which is arranged and configured to establish a data connection with a playback unit and to provide, by means of the data connection, the video and/or audio data to the playback unit.

The invention is based on the realization that charging devices are often located in areas where a data transfer speed of available networks is low. This applies, for example, to highway rest areas or parking lots along rural roads. User terminals, however, may be required to use the charging device, for example, to display videos, images, websites, and/or sounds, or to use apps that describe and/or make the operation of the charging device more convenient. In the context of the described subject matter, a video is or are also understood to be one, two or more images.

However, charging devices for electrically operated vehicles often have a network connection to exchange data of the vehicle owner and/or the charging device with a database. The inventors have found that thus the charging device can be used to provide a data connection with playback units. By means of such a charging device, the data transfer speed for playback units of a user can thus be increased. In particular, the playback unit can thus be enabled to exchange data at an increased data transfer speed even in remote areas so that, for example, a video with audio can be streamed.

The charging unit is configured for charging a vehicle electric storage unit of the vehicle. In particular, the charging unit can be connected to the vehicle electric storage unit of the vehicle and transmit electrical power. The charging unit may be configured for DC charging and/or AC charging. The charging unit may be configured, for example, to be cable-based or wireless. For example, an inductively configured charging unit may be configured to be wireless.

By an electric vehicle storage unit is meant, in particular, a vehicle storage unit that provides electric power. The vehicle electric storage unit can be a battery, for example, which can be configured in particular as an electrochemical energy storage unit. In addition, the vehicle storage unit can be configured as a capacitor or as any other storage unit for providing electrical power.

The charging device further comprises the receiving device, which is arranged and configured to receive video and/or audio data. The receiving device may, for example, be couplable to a network, in particular the Internet. For example, the receiving device may comprise a receiving unit that communicates with an external transmitting device, for example via a network, to receive the video and/or audio data. Furthermore, the receiving device may comprise a receiving storage configured to store, in particular temporarily store, the video and/or audio data.

Furthermore, the receiving device may be configured to communicate with user terminals such that video and/or audio data is transmittable from the user terminal to the charging device. Thus, the use of a display unit comprised by the charging device, which will be explained in more detail below, is particularly advantageously enabled. Furthermore, data stored on the user terminal, in particular video and/or audio data, can be provided to the charging device.

Furthermore, the charging device comprises the communication unit. The communication unit is arranged and configured to establish a data connection with a playback unit and to provide the video and/or audio data to the playback unit by means of the data connection. The communication unit preferably comprises a transmitting unit and/or a receiving unit or a transceiver. The transmitting unit is preferably configured to transmit data to the playback unit by means of the data connection. The receiving unit is preferably configured to receive data, in particular from the playback unit, by means of the data connection.

The playback unit is preferably not comprised by the charging device. The data connection with the playback unit is in particular configured such that data, in particular video and/or audio data, can be transmitted by means of the data connection. This means in particular that data can be transmitted from the communication unit to the playback unit. It is furthermore preferred that data, in particular video and/or audio data, can be transmitted from the playback unit to the communication unit by means of the data connection.

The video and/or audio data is provided by means of the data connection to the playback unit, in particular such that the playback unit can playback a video and/or sounds based on the video and/or audio data.

The communication unit is preferably coupled to the receiving device so that the video and/or audio data received by the receiving device can be made available to the communication unit in such a way that the video and/or audio data can be transmitted, in particular sent, from the communication unit to the playback unit by means of the data connection. It is further preferred that the communication unit is coupled to the receiving storage of the receiving device and can receive the video and/or audio data stored there.

A preferred embodiment of the charging device comprises a network interface configured to connect the receiving device to a network for providing video and/or audio data. For example, the network interface may be configured to be cable-based. Furthermore, the network interface may be configured to be wireless, for example to enable coupling to a wireless network, in particular a 5G network. In particular, the network interface may be configured such that it is configured to connect the charging device, in particular the receiving device, to a global computer network, in particular the Internet. The network interface may further be configured as a network node for communicating with a network, preferably the Internet, to connect the receiving device to the network. Alternatively or additionally, the network interface may be configured such that it is configured to connect the charging device, in particular the receiving device, to a local computer network.

In particular, such a design of the charging device enables a network with a high data transfer speed to be regularly available to the charging device, and thus this data transfer speed can be used for providing the video and/or audio data.

A further preferred embodiment of the charging device is characterized in that the playback unit is a user terminal. The playback unit not comprised by the charging device is thus a user terminal to which the data connection can be established. It is particularly preferred that the user terminal is a portable playback unit. A portable playback unit may be, for example, a smartphone, a tablet, a laptop and/or a radio technology-based audio box, in particular a Bluetooth audio box.

Portable configured user terminals are increasingly used for playback of videos and/or sounds. In particular, the playback of short videos is increasingly used by users of playback units. However, the technically reasonable use of such user terminals is often dependent on the available data transfer speed. In particular, in areas for charging electrically operated vehicles, only such a low data transfer speed is regularly available that the applications mentioned in the foregoing cannot be used or can only be used to a limited extent. This disadvantage is avoided by using the data connection with the charging device mentioned in the preceding.

A further preferred embodiment of the charging device is characterized in that the user terminal is a vehicle playback unit of the vehicle. The vehicle playback unit may be, for example, a vehicle display unit and/or a vehicle audio playback unit. By using the vehicle playback unit for receiving the video and/or audio data, separate user terminals are not necessarily required, so that the available playback units in the vehicle can be used. Thus, a video and/or an audio stream can be transmitted to the playback units available in the vehicle and thus be perceived by a user. The communication unit can also be configured to establish the data connection with a receiving and/or transmitting device of the vehicle, so that the vehicle playback unit receives and/or transmits the video and/or audio data by means of a coupling to the receiving and/or transmitting device of the vehicle.

According to a further preferred embodiment of the charging device, it is provided that the communication unit is configured to provide the video and/or audio data in dependence of a charging power for the vehicle storage unit.

It is preferred that the video and/or audio data can be provided at a charging power of greater than zero. This ensures that the video and/or audio data can only be retrieved when the vehicle storage unit is charging. Furthermore, it may be preferred that the communication unit is configured to provide the video and/or audio data in dependence of a charging state of the vehicle memory unit. For example, the provision of the video and/or audio data can be terminated as soon as the vehicle memory unit has reached a predefined charging status, for example 100%.

Another preferred embodiment of the charging device is characterized in that the communication unit is arranged and configured to receive a network connection request from the user terminal or to send a network connection request to the user terminal, and to receive a device identification of the user terminal based on the network connection request, and to perform a comparison of the device identification of the user terminal to stored device identifications and, if the device identification of the user terminal matches stored device identifications, to permit transmission of the video and/or audio data with the and/or one or more further user terminals and/or, if the device identification of the user terminal does not match stored device identifications, to initiate a registration procedure.

The comparison of the device identification with stored device identifications can ensure that only registered user terminals are allowed to receive the video and/or audio data. Thus, unauthorized access to the charging device, in particular harmful access by viruses, can be prevented. Initiating the registration process may include, for example, transmitting personal data of the user terminal user, such that anonymous access to the charging device is not allowed.

The comparison of the device identification of the user terminal with stored device identifications performed by the communication unit may also be operatively performed by units arranged in the network, such that, for example, the communication unit sends the device identification to a unit arranged in the network, this unit performs the comparison and provides a result of this comparison to the communication unit.

It is further preferred that the charging device is configured to send information to the user terminal, for example information related to an electricity price. Furthermore, the charging device may be configured to be controllable by means of the user terminal, in particular that the charging unit is controllable by means of the user terminal. Furthermore, the user terminal can be mirrored by means of the charging device, so that a display of the user terminal is displayed on the charging device and/or a display of the charging device is displayed on the user terminal.

Another preferred embodiment of the charging device provides that the playback unit comprises a display unit comprised by the charging device, preferably configured as an integrated screen, wherein the communication unit is arranged and configured to provide the video data to the display unit, and wherein the display unit is arranged and configured to display videos based on the video data to a vehicle occupant, in particular a vehicle user, of a vehicle charging by the charging device.

A charging device configured in this way has the advantage that the volume of data to be transmitted is reduced. If necessary, only audio data is to be transmitted in this embodiment. Furthermore, the power consumption can be reduced. Depending on the design of the charging unit and the data connection, if applicable, the reduction of the volume of data to be transmitted can increase the charging power, since the cable is substantially fully available for charging the vehicle storage unit. In addition, the quality of video playback may be improved because a screen on a charging device may be configured to be larger than those available in a vehicle, such as a smartphone or an integrated screen of the vehicle.

For example, the display unit may have a screen diagonal between 50 inches and 100 inches, particularly between 60 inches and 80 inches. It has been found that such a screen diagonal is particularly advantageous for displaying videos for users of charging devices. In addition, the display device may have a screen diagonal greater than 70 inches, for example greater than 2 meters, greater than 3 meters, greater than 4 meters, greater than 5 meters, and/or greater than 6 meters. Such a screen diagonal is particularly advantageous for displaying video to two or more users of the charging device.

Another preferred embodiment of the charging device is characterized in that the playback unit comprises an audio unit comprised by the charging device, wherein the communication unit is arranged and configured to provide the audio data of the audio unit, and wherein the audio unit is arranged and configured to playback sounds based on the audio data to a vehicle occupant, in particular a vehicle user, of the vehicle charging by the charging device. The audio unit may also be comprised by the display unit. The vehicle user may be the user of the charging device.

This embodiment is characterized, analogously to the embodiment described in the preceding, in that the volume of data to be transmitted is reduced. Thus, the power consumption is reduced and a higher charging power can be enabled if necessary. In addition, instructions relating to the charging process can be emitted to the vehicle occupant by means of the audio unit.

According to a further preferred embodiment of the charging device, the data connection established between the communication unit and playback unit is wireless. It is common practice to provide data via charging cables. This known principle is still widely used today. An example of this is the well-known method data via socket, whereby data is transmitted via power cables and can be tapped at a socket in the household. For example, when charging a vehicle storage unit, data can be exchanged between the vehicle and the charging device, for example relating to a state of charge and/or a maximum charging power.

The transfer of data, for example via a charging cable, between the charging device and the vehicle reduces the charging power. Since data is transmitted in addition to power, the maximum charging power to be transmitted is less than the maximum possible. In particular, the more video and/or audio data that needs to be transferred from the charging device to the playback unit, the lower the charging power. Against the background of higher-resolution videos and higher-quality audio streams, the amounts of data to be transmitted are constantly increasing.

A wirelessly configured data connection established the communication unit and the playback unit can thus enable higher charging power for the vehicle storage unit. Additionally or alternatively, a smaller cable cross-section can be selected so that the costs of the charging device are reduced and the use of the charging device becomes more convenient. Preferably, the communication unit comprises a transmission unit configured to wirelessly transmit data. Furthermore, the communication unit preferably comprises a receiving unit configured to wirelessly receive data. The data mentioned in the foregoing are in particular video and/or audio data.

According to a further preferred embodiment of the charging device, it is provided that the communication unit comprises a network unit arranged and configured to establish a local network, wherein the data connection is establishable by means of the local network. The local network facilitates establishing the data connection between the communication unit and a playback unit. The local network may be, for example, a LAN network or a W-LAN network.

Another preferred embodiment of the charging device is characterized in that the charging device comprises a charging cable that is connectable to a vehicle such that a vehicle electric storage unit of the vehicle is chargeable. In particular, it is preferred that the charging cable is configured substantially exclusively for charging the electric vehicle storage unit of the vehicle. Essentially exclusively means in particular that no video and/or audio data is transmitted.

According to a further preferred embodiment of the charging device, it is provided that the latter comprises a charging storage unit that is configured to store and/or provide electrical energy. The charging storage unit may be spatially separate from one or more further components of the charging device or integrally configured. For example, the charge storage unit may be an accumulator. The charging storage unit enables an improved charging device in that it can be charged by means of regeneratively produced electricity, for example, and thus the proportion of regeneratively used energy for charging the vehicle storage unit is increased. Furthermore, the charge storage unit can be used with a so-called booster function to reduce the charging time.

Another preferred embodiment of the charging device is characterized in that the communication unit is configured to receive an input from the user terminal and to provide the video and/or audio data based on the received input.

According to a further aspect, the above-mentioned objective is solved by a method for charging an electric vehicle storage unit, in particular an electrically operated vehicle, comprising the steps of: charging the electric vehicle storage unit with a charging device, in particular a charging device according to one of the embodiments described in the preceding, receiving and/or transmitting video and/or audio data with a receiving device of the charging device, establishing a data connection between a communication unit of the charging device and a playback unit, and providing the video and/or audio data to the playback unit, which is preferably a user terminal, by means of the communication unit of the charging device.

The method of charging an electric vehicle playback unit enables the use of playback units in such areas that have low data transfer speed for playback units, especially for user terminals, or where no network is available for playback units. Thus, charging of the vehicle electric storage unit is also improved for drivers of the vehicle by improving the convenience of charging, reducing the time required to charge a vehicle storage unit, increasing a charging power, and enabling improved use of playback devices during charging.

In a preferred embodiment of the method, the data connection is configured to be wireless. For example, the wireless data connection can be established using a W-LAN and protocols known to those skilled in the art that underlie this technology.

Another preferred embodiment of the method provides that the provision of the video and/or audio data is performed as a function of a charging power for the vehicle storage unit. For example, providing the video and/or audio data may only occur when the charging power is greater than zero.

Further, the method may comprise the steps of: receiving a network connection request from the user terminal or sending a network connection request to the user terminal, receiving a device identification of the user terminal based on the network connection request, performing a comparison of the device identification of the user terminal with stored device identifications, allowing transmission of the video and/or audio data with the and/or one or more user terminals if the device identification of the user terminal matches with stored device identifications, or initiating a registration procedure if the device identification of the user terminal does not match with stored device identifications.

In particular, the match is determined such that the device identification of the user terminal is compared with the stored device identifications and, if the device identification of the user terminal is identical to one of the stored device identifications, a positive comparison is determined such that the transmission is permitted.

According to a further aspect, the above-mentioned objective is solved by a computer program product comprising instructions which, when the program is executed by a computer, cause the computer to execute the method according to one of the embodiments described in the preceding.

According to a further aspect, the above-mentioned objective is solved by a computer readable storage media comprising instructions which, when the program is executed by a computer, cause the computer to execute the method according to one of the embodiments described above.

The method and its possible embodiments have features and method steps, respectively, which make them particularly suitable to be used for a charging device and its embodiments.

For further advantages, embodiment variants and embodiment details of the further aspects and their possible further embodiments, reference is also made to the description given previously regarding the corresponding features and further embodiments of the charging device.

Preferred embodiments are explained by way of example with reference to the accompanying figures. They show:

FIG. 1: a schematic view of an exemplary embodiment of a charging device; and

Figure 2:
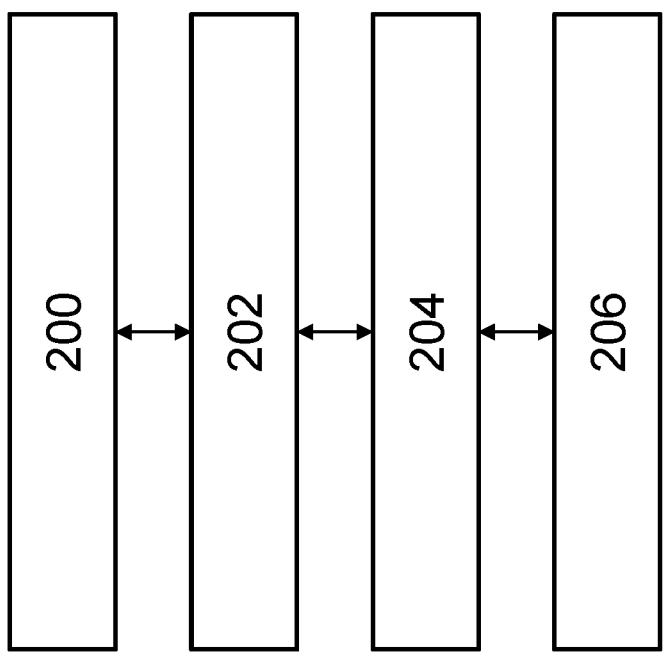

FIG. 2: a schematic view of an exemplary method.

In the figures, identical or substantially functionally identical or similar elements are designated with the same reference signs.

FIG. 1 shows a charging device 100 comprising a charging unit 102 for charging an electric vehicle storage unit 2 of a vehicle 1. The charging device 100 further comprises a receiving device 104 for receiving video and/or audio data. The video and/or audio data may be received and provided in, for example, MPEG-2 or MPEG-4 format. Connections between the individual units of the charging device 100 and the units of the vehicle 1 are shown illustratively in the figures and are not limited thereto.

Furthermore, the charging device comprises a communication unit 106 which is arranged and configured to establish a data connection 108 with a playback unit 4 and to provide video and/or audio data to the playback unit 4 by means of the data connection 108. The data connection 108 may be configured wirelessly, for example as a W-LAN connection. In particular, the video and/or audio data is provided to the playback unit 4 by the communication unit 106 such that the playback unit 106 can playback a video and/or sounds underlying the video and/or audio data.

The charging device 100 further comprises a preferably large-area display unit 110. The display unit 110 is in particular arranged and configured such that a vehicle occupant of the vehicle 1 can perceive a video on the display unit 110 during the charging process. Furthermore, the charging device 100 comprises an audio unit 114. The audio unit 114 is configured to play sounds, in particular based on audio data. As a result, a video with an audio soundtrack can be provided to a vehicle occupant without transmitting the data to the playback unit 4. Thus, data consumption is reduced and charging power is increased by means of the charging cable 116.

Furthermore, the charging device 100 comprises a network interface 112 configured to connect the charging device 100 to a network. The network may be, for example, the Internet. In particular, the network interface 112 is configured to connect the communication unit 106 to a network for providing video and/or audio data. The network interface 112 is preferably cable-based and/or configured as a network node of a network and/or the Internet, such that a cable connects the charging device 100 to the network.

Furthermore, the charging device 100 may comprise a network unit, preferably comprised by the communication unit 106, which is arranged and configured to establish and/or provide a local, preferably wireless, network 118. Preferably, the data connection 108 is arrangeable by means of the local network 118.

FIG. 2 shows a schematic method provided for charging an electric vehicle storage unit 2 of an electrically operated vehicle 1. In step 200, the vehicle electric storage unit 2 is charged using a charging device 100. In step 202, video and/or audio data is received with a receiving device 104 of the charging device 100. It is further possible that the vehicle electric storage unit 2 is discharged in step 200 to provide electric power to a power grid.

In step 204, a data connection is established between a communication unit 106 of the charging device 100 and a playback unit 4. Alternatively, step 204 may be performed first, followed by step 202. In other words, the data connection 108 is first established between the communication unit 106 of the charging device 100 and the playback unit 4. Then, video and/or audio data is received by the receiving device 104 of the charging device 100. In doing so, the communication unit 106 may receive a request from the playback unit 4 for one or more specific video and/or audio data. The request for the video and/or audio data may be forwarded by the communication unit 106 to the receiving device 104 so that the receiving device 104 receives the video and/or audio data in accordance with the request.

In step 206, the video and/or audio data is provided to the playback unit 4. This provisioning is done by means of the communication unit 106 of the charging device 100. The playback unit 4 is preferably a user terminal, such as a smartphone, a tablet, a laptop and/or a Bluetooth audio box. Further, the playback unit 4 may be a vehicle playback unit. The steps mentioned in the foregoing may be partially performed in parallel or in a sequence different from the sequence described.

It is preferred that establishing the data connection in step 204 is such that the data connection 108 is wirelessly configured. It is further preferred that providing the video and/or audio data in step 206 is performed in dependence of a charging power for the vehicle storage unit 2.

Furthermore, the method may comprise the step of: receiving a network connection request from the user terminal 4 or sending a network connection request to the user terminal 4, receiving a device identification 6 of the user terminal 4 based on the network connection request. Furthermore, a comparison of the device identification 6 with stored device identifications may be performed. It is further preferred that thereupon, transmission of the video and/or audio data with the user terminal is permitted upon a match of the device identification 6 of the user terminal 4 with stored device identifications. Furthermore, it may be preferred that a registration procedure is initiated when there is no match of the device identification 6 of the user terminal 4 with stored device identifications.

Using the charging device 100 and the method described in the foregoing, video and/or audio data can be transmitted to playback units 4 in remote areas with low data transfer speeds. As a result, the charging process for electric vehicles is additionally improved. Furthermore, when a wireless data connection 108 is formed, the charging power of the charging device 100 can additionally be improved so that the vehicle storage unit 2 can be charged in a shorter time.

REFERENCE SIGNS 1 vehicle
2 vehicle storage unit
4 playback unit
6 device identification
100 charging device
102 charging unit
104 receiving device
106 communication unit
108 data connection
110 display unit
112 network interface
114 audio unit
116 charging cable
118 local network

The invention claimed is:

1. A charging device for electrically operated vehicles, comprising
   a charging unit for charging an electric vehicle storage unit of the vehicle,
   a receiving device for receiving video and/or audio data, and
   a communication unit coupled to the receiving device,
   a display unit having a screen integrated with the charging device, wherein the communication unit is arranged and configured to establish a data connection with the display unit and to provide the video and/or audio data to the display unit by means of the data connection, wherein the communication unit is arranged and configured to provide the video data to the display unit, and wherein the display unit is arranged and configured to display videos based on the video data to a vehicle occupant of a vehicle charging by the charging device, wherein the display unit is arranged and configured such that the vehicle occupant of the vehicle can perceive a video on the display unit during the charging process.

2. The charging device according to claim 1, comprising a network interface, the network interface configured to connect the receiving device to a network for providing video and/or audio data, wherein the network interface is cable-based.

3. The charging device according to claim 1, wherein the communication unit is arranged and configured to establish a data connection with a playback unit, wherein the playback unit is a user terminal, and the user terminal is a portable playback unit.

4. The charging device according to claim 1, wherein the communication unit is arranged and configured to establish a data connection with a playback unit and the playback unit is a vehicle playback unit of the vehicle.

5. The charging device according to claim 1, wherein the communication unit is configured to provide the video and/or audio data in dependence of a charging power for the vehicle storage unit.

6. The charging device according to claim 1, wherein the communication unit is arranged and configured to establish a data connection with a user terminal and the communication unit is arranged and configured to:
   receive a network connection request from the user terminal or send a network connection request to the user terminal, and receive a device identification of the user terminal based on the network connection request,
   perform a comparison of the device identification of the user terminal with stored device identifications, and
   if the device identification of the user terminal matches stored device identifications, allow transmission of the video and/or audio data with the user terminal, and/or if the device identification of the user terminal does not match stored device identifications, initiate a registration procedure.

7. The charging device according to claim 1, further comprising an audio unit, and
   wherein the communication unit is arranged and configured to provide the audio data to the audio unit, and
   wherein the audio unit is arranged and configured to playback sounds based on the audio data to a vehicle occupant of the vehicle charging by the charging device.

8. The charging device according to claim 1, wherein the data connection established between the communication unit and the display unit is configured wirelessly.

9. The charging device according to claim 1, wherein the communication unit comprises a network unit arranged and configured to establish a local network, wherein the data connection is established by means of the local network.

10. The charging device according to claim 1, comprising a charging cable connectable to a vehicle such that a vehicle electric storage unit of the vehicle is chargeable.

11. The charging device according to claim 1, comprising a charging storage unit configured to store and/or provide electrical energy.

12. A method for charging an electric vehicle storage unit, comprising the steps of:
   charging the vehicle electric storage unit with a charging device,
   receiving video and/or audio data with a receiving device of the charging device,
   establishing a data connection between a communication unit and a display unit, the display unit having a screen integrated with the charging device, and
   providing the video and/or audio data to the display unit, by means of the communication unit of the charging device, wherein the communication unit is arranged and configured to provide the video data to the display unit, and wherein the display unit is arranged and configured to display videos based on the video data to a vehicle occupant of a vehicle charging by the charging device, wherein the display unit is arranged and configured such that the vehicle occupant of the vehicle can perceive a video on the display unit during the charging process.

13. The method according to claim 12, wherein the data connection is wirelessly configured.

14. The method according to claim 12, wherein providing the video and/or audio data is performed in dependence of a charging power for the vehicle storage unit.

15. The method according to claim 12, further comprising the steps of:
   establishing a data connection between the communication unit and a user terminal,
   receiving a network connection request from the user terminal or sending a network connection request to the user terminal,
   receiving a device identification of the user terminal based on the network connection request,
   performing a comparison of the device identification of the user terminal with stored device identifications,
   allowing transmission of the video and/or audio data with the user terminal if the device identification of the user terminal matches with stored device identifications, or initiating a registration procedure if the device identification of the user terminal does not match with stored device identifications.

16. A computer program product comprising a non-transitory computer readable media comprising instructions that, when the program is executed by a computer, cause the computer to execute the method of claim 12.

17. A non-transitory computer readable storage media comprising instructions that, when executed by a computer, cause the computer to execute the method of claim 12.

* * * * *